(12) United States Patent
Yan et al.

(10) Patent No.: US 11,402,674 B2
(45) Date of Patent: Aug. 2, 2022

(54) SILICON-BASED ELECTRO-OPTIC MODULATOR

(71) Applicant: InnoLight Technology (Suzhou) LTD., Jiangsu (CN)

(72) Inventors: Dongdong Yan, Jiangsu (CN); Xianyao Li, Jiangsu (CN)

(73) Assignee: InnoLight Technology (Suzhou) Ltd., Suzhou (CN)

(*) Notice: Subject to any disclaimer, the term of this patent is extended or adjusted under 35 U.S.C. 154(b) by 9 days.

(21) Appl. No.: 16/997,363

(22) Filed: Aug. 19, 2020

(65) Prior Publication Data

US 2021/0055581 A1    Feb. 25, 2021

(30) Foreign Application Priority Data

Aug. 22, 2019    (CN) .......................... 201910777805.X (51) Int. Cl.
| | | |
|---|---|---|
| *G02F 1/03* | (2006.01) | |
| *G02F 1/035* | (2006.01) | |
| *G02F 1/225* | (2006.01) | |

(52) U.S. Cl.
CPC .......... *G02F 1/0356* (2013.01); *G02F 1/0316* (2013.01); *G02F 1/2255* (2013.01); *G02F 2201/07* (2013.01); *G02F 2201/127* (2013.01)

(58) Field of Classification Search
CPC .... G02F 1/0356; G02F 1/0316; G02F 1/2255; G02F 2201/07; G02F 2201/127
See application file for complete search history.

(56) References Cited

U.S. PATENT DOCUMENTS

| | | | |
|---|---|---|---|
| 5,455,876 A | 10/1995 | Hopfer et al. | |
| 6,310,700 B1 * | 10/2001 | Betts ...................... | B82Y 10/00 359/2 |
| 6,646,776 B1 | 11/2003 | Cheung et al. | |
| 2008/0170818 A1 | 7/2008 | Kissa et al. | |

FOREIGN PATENT DOCUMENTS

CN          101221295 A        7/2008

OTHER PUBLICATIONS

Wang et al., Multiband guided-mode resonance filter in bilayer asymmetric metallic Gratings, Optics and Laser Technology 103 (2018) 135-141 (Year: 2018).*
Boes et al., Status and Potential of Lithium Niobate on Insulator (LNOI) for Photonic Integrated Circuits, Laser Photonics Rev. 2018, 1700256 (Year: 2018).*
Liu et al., High-Gain Grating Antenna With Surface Wave Launcher Array, IEEE Antennas And Wireless Propagation Letters, vol. 17, No. 4, Apr. 2018. (Year: 2018).*
Lee et al., Remote grating-assisted excitation of narrow-band surface plasmons, Nov. 8, 2010 / vol. 18, No. 23 / Optics Express 23857 (Year: 2010).*

* cited by examiner

*Primary Examiner* — Peter Radkowski
(74) *Attorney, Agent, or Firm* — Finnegan, Henderson, Farabow, Garrett & Dunner, LLP (57) ABSTRACT

A silicon-based electro-optic modulator includes a substrate layer, an insulation layer, and an optical waveguide layer stacked sequentially, traveling wave electrodes disposed above the optical waveguide layer, and a metal grating structure periodically configured along the direction in which an electrical signal propagates in the traveling wave electrodes. The metal grating structure is disposed above the optical waveguide layer.

11 Claims, 5 Drawing Sheets

SILICON-BASED ELECTRO-OPTIC MODULATOR

CROSS-REFERENCE TO RELATED APPLICATION

This application is based upon and claims priority to Chinese Patent Application 201910777805.X, filed on Aug. 22, 2019, the entire content of which is incorporated herein by reference.

FIELD OF THE DISCLOSURE

The present disclosure relates to the field of optical communication and, more particularly, to a silicon-based electro-optic modulator.

BACKGROUND

In silicon-based integrated optoelectronic systems, traveling wave electrode modulators are widely used due to their high light extinction ratio and easiness for integration. Traveling wave electrode modulators are usually made into silicon-based electro-optic modulators with silicon-on-insulator (SOI) technology. A traveling wave electrode modulator based on SOI technology is typically made up of an optical waveguide load and traveling wave electrodes. An electromagnetic wave propagates between the traveling wave electrodes, and an optical carrier propagates in a loaded optical waveguide. As the optical carrier and the electromagnetic wave propagate, interaction between the electromagnetic wave and the optical carrier causes a change in the phase of the optical carrier, thereby completing modulation of an optical signal with an electrical signal. The main performance indicators of a traveling wave electrode modulator include electro-optic bandwidth and impedance. A higher electro-optic bandwidth and an appropriate impedance are usually desired in a design. There are primarily two factors that affect the electro-optic bandwidth. The first factor is loss in loaded traveling wave electrodes, and the second factor is the degree of matching between a group velocity of the electromagnetic wave (which is a microwave) and a group velocity of an optical carrier of the traveling wave electrode modulator. Designing of a traveling wave electrode modulator requires both lower microwave loss and the same group velocity for the microwave and the optical carrier.

In currently available SOI technology, there are primarily two types of silicon used for substrates. These two types of silicon are typically distinguished by their resistivity: one type is high resistivity silicon with a resistivity higher than 750 Ohm·cm, and the other type is low resistivity silicon with a resistivity around 10 Ohm·cm. In some technologies using low resistivity silicon for substrates, the resistivity of the low resistivity silicon substrates is relatively low, and therefore significant attenuation will occur in an electromagnetic field radiated from the traveling wave electrodes to the low resistivity silicon substrate. This will result in high microwave loss for the traveling wave electrode modulator, thereby causing the overall electro-optic bandwidth of the traveling wave electrode modulator to be low and severely limiting the performance and application of the traveling wave electrode modulator. In addition, in the design of the traveling wave electrode modulator, the group velocity of the electromagnetic wave is typically higher than the group velocity of the optical carrier. As a result, there will be a velocity mismatch as the electromagnetic wave and the optical carrier propagate, further reducing the electro-optic bandwidth of the modulator.

SUMMARY

Purposes of the present disclosure include providing a silicon-based electro-optic modulator that has improved electro-optic matching and lower microwave loss and is capable of providing a higher electro-optic bandwidth.

In order to achieve one or more of the aforementioned purpose, one embodiment of the present disclosure provides a silicon-based electro-optic modulator, including a substrate layer, an insulation layer, and an optical waveguide layer stacked sequentially, traveling wave electrodes disposed above the optical waveguide layer, and a metal grating structure disposed above the optical waveguide layer and periodically configured along a direction in which an electrical signal propagates in the traveling wave electrodes.

DETAILED DESCRIPTION

The text below provides a detailed description of the present disclosure with reference to specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another member or layer or "connected to" another member or layer, it may be directly above the other member or layer or directly connected to the other member or layer, or there may be an intermediate component or layer.

An optical modulation system is made up of a driver and a modulator. Traveling wave electrode modulators are widely used due to their higher light extinction ratio and easiness for integration. Traveling wave electrode modulators are categorized into single-drive and dual-drive by their drive mode, and into series push-pull structure, separate double-arm structure, and other structures by their optical waveguide layout.

Figure 1:
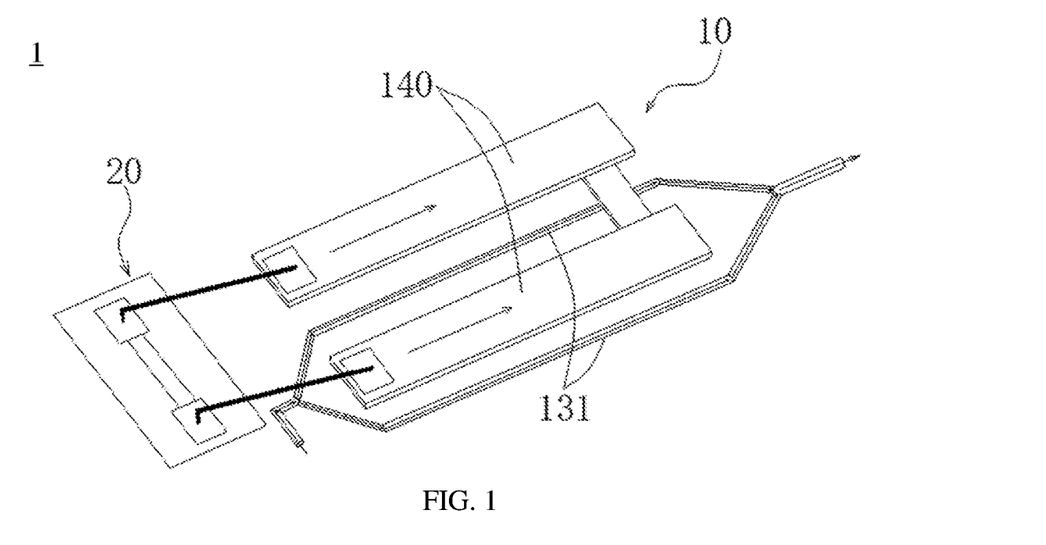
FIG. 1 is a diagram illustrating an optical modulation system.
Figure 2:
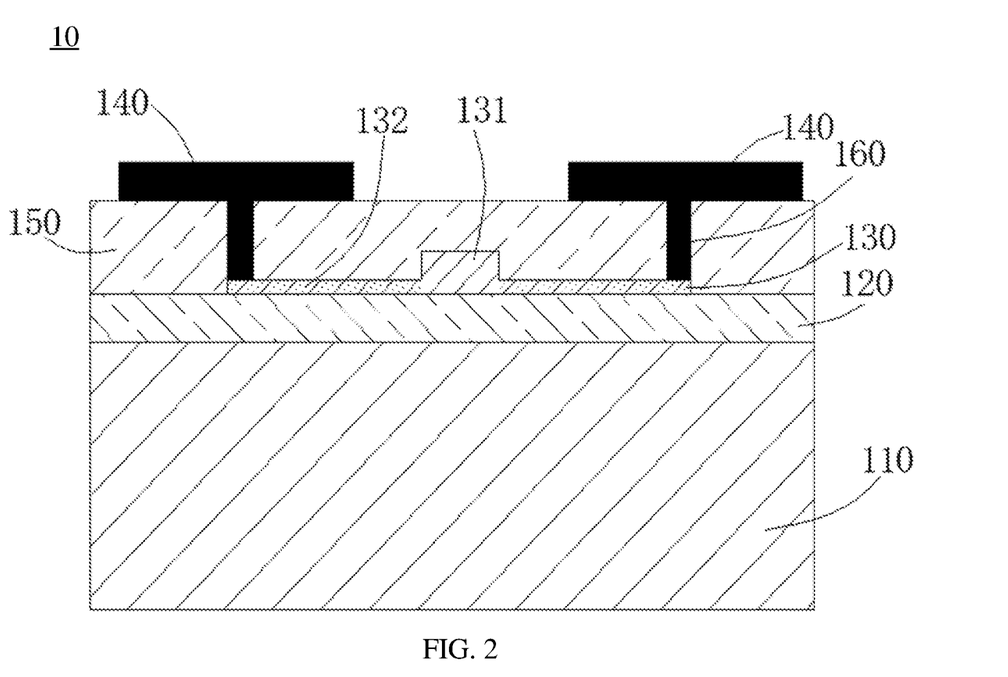
FIG. 2 is a diagram illustrating a cross-sectional area of a silicon-based traveling wave electrode modulator.

FIG. 1 is a diagram illustrating an optical modulation system 1. As illustrated in FIG. 1, the optical modulation system 1 is a traveling wave electrode modulation system which is primarily made up of a driver 20 and a traveling wave electrode modulator 10. FIG. 2 illustrates a cross section of a modulation area of the traveling wave electrode modulator 10. The traveling wave electrode modulator 10 is made with silicon on insulator (SOI) technology. The traveling wave electrode modulator 10 includes a substrate layer 110, an insulation layer 120, and an optical waveguide layer 130 stacked sequentially, traveling wave electrodes 140 disposed above the optical waveguide layer 130, and an insulating cover layer 150 disposed between the traveling wave electrodes 140 and the optical waveguide layer 130. The substrate layer 110 comprises low resistivity silicon. The insulation layer 120 comprises an insulating oxide. The optical waveguide layer 130 is made by etching a top silicon layer in a SOI structure and includes an optical waveguide 131. Doped regions are manufactured on both sides of the optical waveguide 131 to form doped electrodes 132. The doped electrodes 132 are electrically connected to their corresponding traveling wave electrodes 140 above the optical waveguide layer 130 by means of electrically conductive structures 160.

The principle of operation is as follows. The driver 20 is connected to the traveling wave electrode modulator 10 by means of wire bonding. The optical waveguide 131 is placed in an electric field of the traveling wave electrodes 140. A high speed digital signal outputted by the driver 20 reaches the traveling wave electrode modulator 10 and propagates in the traveling wave electrodes 140. An optical wave propagates in the optical wave guide 131. A change of the electric field caused by the high speed digital signal in the traveling wave electrodes 140 will cause a change in an effective refractive index of the optical waveguide 131. Therefore, when the high speed digital signal propagates in the traveling wave electrodes 140, the electric field of the traveling wave electrodes 140 causes the refractive index of the optical waveguide 131 to change and thereby changes a phase of an optical carrier, causing the optical carrier to carry information of the digital signal. The optical carrier interferes in a Mach-Zehnder interferometer at a rear end of the traveling wave electrode modulator 10 and thereby completes modulation.

In order to solve the problems of large microwave loss of the traveling wave electrode modulator 10 and a mismatch between an electromagnetic wave propagating in the traveling wave electrodes 140 and the optical carrier, caused by a higher velocity of the electromagnetic wave, a silicon-based electro-optic modulator according to the embodiments of the present disclosure has a metal grating structure added at the periphery of the traveling wave electrodes 140 of the aforementioned traveling wave electrode modulator 10. The metal grating structure causes a group velocity of the electromagnetic wave propagating in the traveling wave electrodes 140 to match a group velocity of the optical carrier and improves the degree of electro-optic matching for the traveling wave electrodes 140. The metal grating structure also shields, from the low resistivity silicon substrate 110, an electromagnetic field radiated from the traveling wave electrodes 140, in order to reduce microwave loss of the traveling wave electrodes 140, thereby effectively improving the electro-optic bandwidth of the electro-optic modulator.

Figure 3:
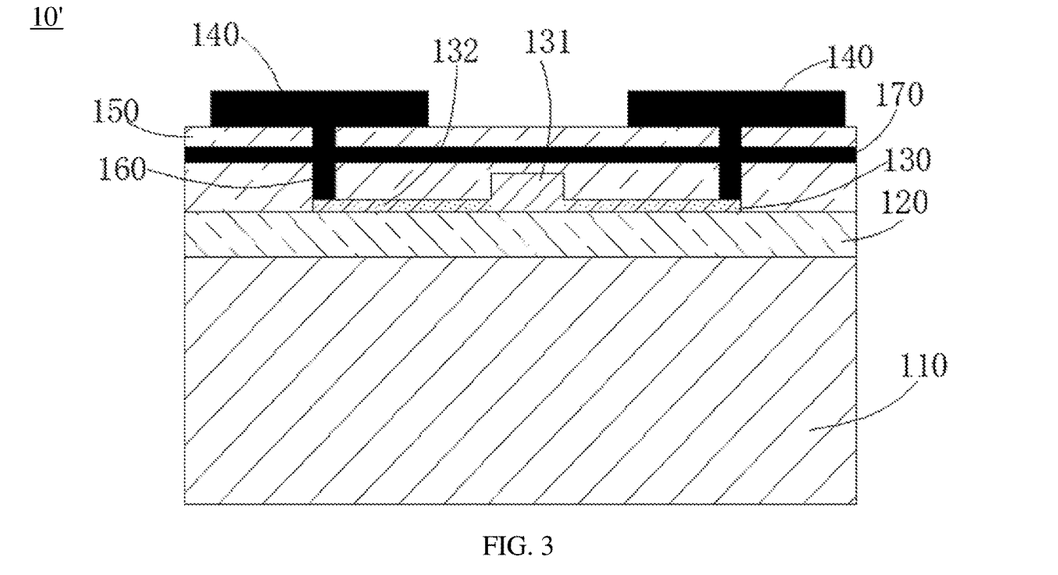
FIG. 3 is a diagram illustrating a cross-sectional area of a silicon-based traveling wave electrode modulator in which a metal layer is deposited in a cover layer according to an embodiment of the present disclosure.

A complementary metal-oxide-semiconductor (COMS) integrated device provides many advantages such as low power consumption, high speed, strong anti-interference ability, and high level of integration. Therefore, silicon-based electro-optic modulators may be manufactured with COMS technology and provide higher modulation efficiency. FIG. 3 illustrates a cross section of a modulation area of a traveling wave electrode modulator 10' in which a metal layer is deposited in a cover layer in COMS technology according to an embodiment of the present disclosure. As illustrated in FIG. 3, a plurality of metal layers 170 may be deposited in the cover layer 150 above the optical waveguide layer 130 to define interconnections among integrated devices in a semiconductor chip. In the silicon-based electro-optic modulator according to the embodiments of the present disclosure, the metal grating structure may be manufactured by depositing a metal layer 170 in the cover layer 150 with COMS technology. The metal grating structure may be disposed above, below, or on both sides of the traveling wave electrodes.

First Embodiment

Figure 4:
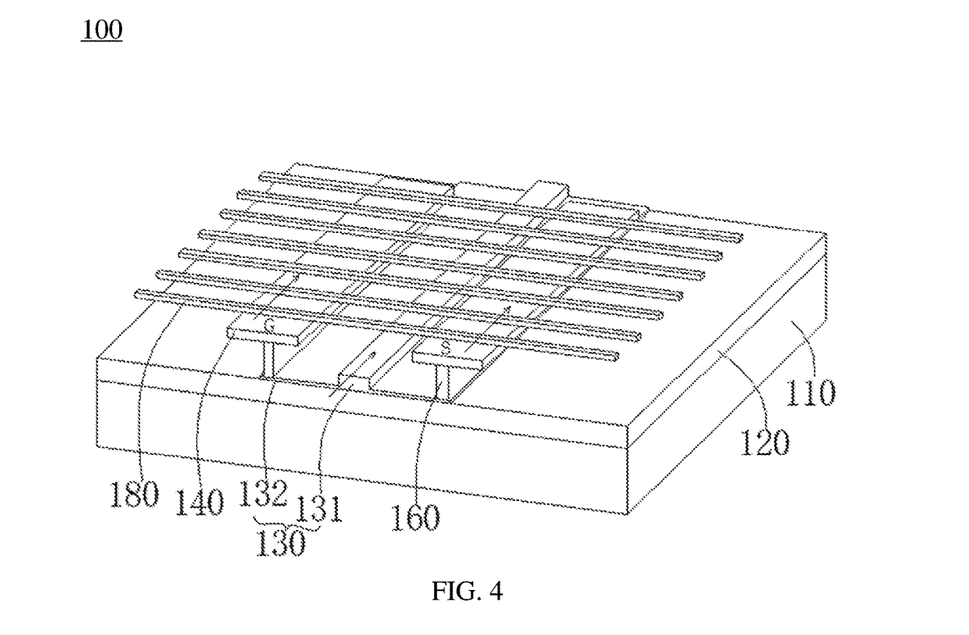
FIG. 4 is a diagram illustrating a silicon-based electro-optic modulator according to a first embodiment of the present disclosure.

FIG. 4 is a diagram illustrating a silicon-based electro-optic modulator 100 according to a first embodiment of the present disclosure. As illustrated in FIG. 4, in the first embodiment, the silicon-based electro-optic modulator 100 includes the substrate layer 110, the insulation layer 120, and the optical waveguide layer 130 stacked sequentially, traveling wave electrodes 140 disposed above the optical waveguide layer 130, and a metal grating structure 180 disposed at the periphery of the traveling wave electrodes 140. As described above, the substrate 110 comprises low resistivity silicon, the insulating layer 120 comprises an insulating oxide, and the optical waveguide layer 130 is made by etching a top silicon layer in the SOI structure. The metal grating structure 180 is periodically configured along the direction in which an electrical signal propagates in the traveling wave electrodes 140. The optical waveguide layer 130 includes an optical waveguide 131 and doped electrodes 132 disposed on both sides of the optical waveguide 131. The doped electrodes 132 are electrically connected to their corresponding traveling wave electrodes 140 above the optical waveguide layer 130 by means of electrically conductive structures 160. In the first embodiment, the traveling wave electrodes 140 are ground-signal (GS) traveling wave electrodes, including a ground wire G and a signal wire S. The ground wire G and the signal wire S are respectively located above the doped electrodes 132 on both sides of the optical waveguide 131 and are electrically connected to the doped electrodes 132 respectively by means of their corresponding electrically conductive structures 160. In the first embodiment illustrated in FIG. 4, the electrically conductive structure 160 is a continuous electrically conductive panel structure. In another embodiment, the electrically conductive structure 160 may be made up of a number of electrically conductive vias, or, may employ another structure.

In the first embodiment, the metal grating structure 180 is disposed above the traveling wave electrodes 140 and is configured to be electrically insulated from the traveling wave electrodes 140. The traveling wave electrodes 140 are manufactured from a metal layer deposited within a cover layer, and the metal grating structure 180 is manufactured from a metal layer deposited on top of the traveling wave electrodes 140. In order to clearly show the metal grating structure 180, the cover layer is not illustrated in FIG. 4 or any other drawing thereafter. In the first embodiment, the metal layer used for manufacturing the traveling wave electrodes 140 and the metal layer used for manufacturing the metal grating structure 180 are made of the same material, such as aluminum or copper.

The periodic structure of the metal grating structure 180 can effectively reduce the propagation velocity of an electromagnetic wave, i.e., the velocity of the electromagnetic wave propagating along the traveling wave electrodes 140, causing the group velocity of the electrical signal propagating in the traveling wave electrodes 140 to match the group velocity of the optical carrier propagating in the optical waveguide 131 of the optical waveguide layer 130, thereby resolving the problem of electro-optic mismatch in the electro-optic modulator 100 and increasing the electro-optic bandwidth of the electro-optic modulator 100. In the first embodiment, the period of the metal grating structure 180 is in the range of 4 μm to 15 μm with a duty cycle in the range of 10 to 25. This enables the group velocity of the electrical signal propagating in the traveling wave electrodes 140 to be closer to the group velocity of the optical carrier propagating in the optical waveguide 131.

Figure 5:
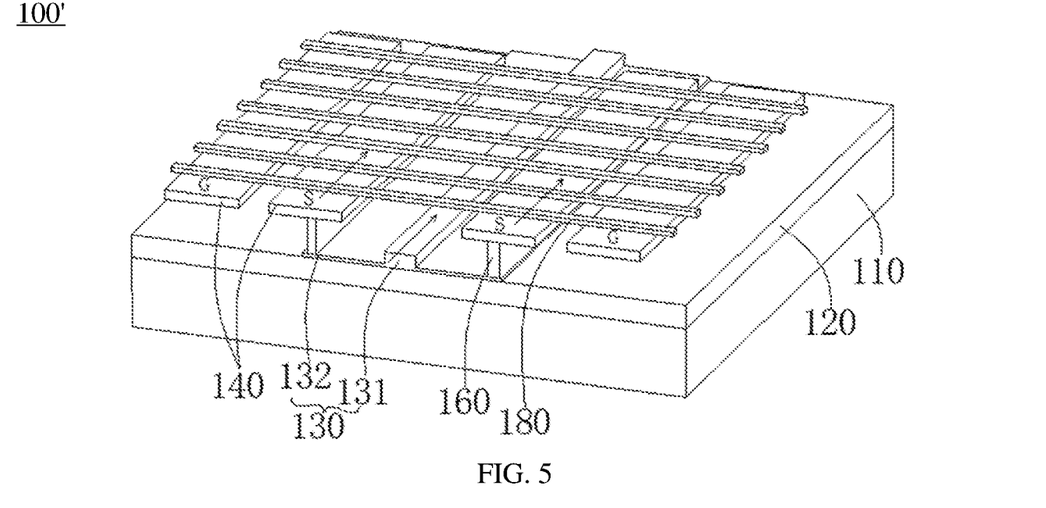
FIG. 5 is a diagram illustrating a silicon-based electro-optic modulator that employs GSSG traveling wave electrodes according to a variation of the first embodiment of the present disclosure.

In the embodiment illustrated in FIG. 4, the electro-optic modulator 100 employs single-end-drive GS traveling wave electrodes 140. FIG. 5 is a diagram illustrating a silicon-based electro-optic modulator 100' according to a variation of the first embodiment of the present disclosure. In the embodiment illustrated in FIG. 5, the electro-optic modulator 100' may employ differential-drive GSSG traveling wave electrodes, i.e., the traveling wave electrodes 140 includes two ground (G) wires and two signal (S) wires. The two signal (S) wires are respectively located above the doped electrodes 132 on both sides of the optical waveguide 131 and are electrically connected to the doped electrodes 132 respectively by means of their corresponding electrically conductive structures 160. The two ground (G) wires are electrically connected to an external ground. Still alternatively, the electro-optic modulator may employ another type of traveling wave electrode.

Second Embodiment

Figure 6:
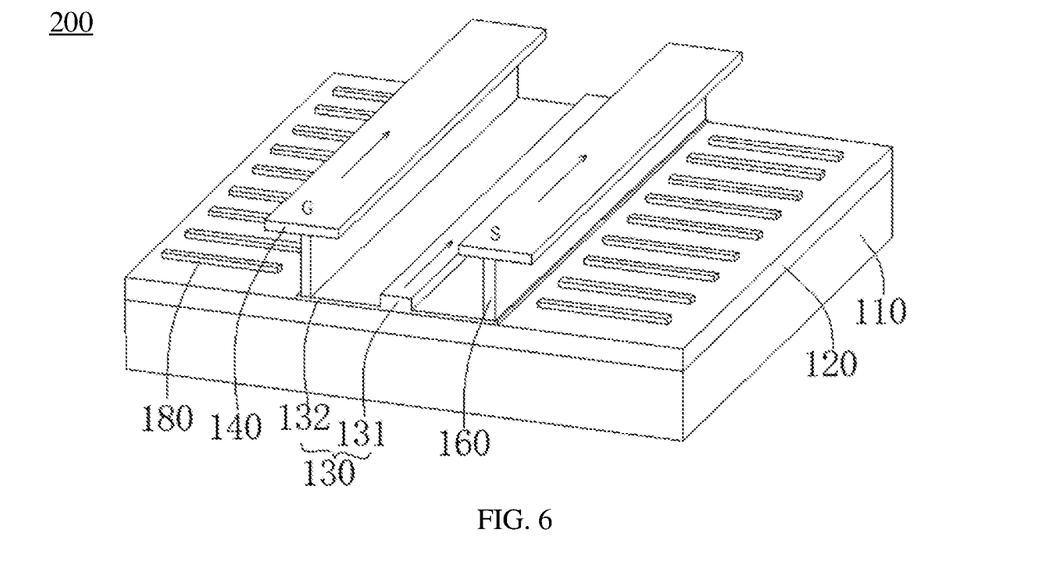
FIG. 6 is a diagram illustrating a silicon-based electro-optic modulator according to a second embodiment of the present disclosure.

FIG. 6 is a diagram illustrating a silicon-based electro-optic modulator 200 according to a second embodiment of the present disclosure. As illustrated in FIG. 6, the second embodiment differs from the first embodiment in that the metal grating structure 180 is disposed between the traveling wave electrodes 140 and the optical waveguide layer 130. Similar to the metal grating structure 180 in the first embodiment, the metal grating structure 180 in the second embodiment is also configured to be electrically insulated from the traveling wave electrodes 140. In other words, the metal grating structure 180 is manufactured from a metal layer deposited within a cover layer, and the traveling wave electrodes 140 are manufactured from a metal layer deposited on top of the metal grating structure 180. Similar to the first embodiment, in the second embodiment, the metal layer used for manufacturing the traveling wave electrodes 140 and the metal layer used for manufacturing the metal grating structure 180 are also made of the same material. In the second embodiment, the periodic structure of the metal grating structure 180 reduces the velocity of the electromagnetic wave propagating along the traveling wave electrodes 140, causing the group velocity of the electrical signal propagating in the traveling wave electrodes 140 to match the group velocity of an optical carrier propagating in the optical waveguide 131 of the optical waveguide layer 130, thereby resolving the problem of electro-optic mismatch in the electro-optic modulator 200 and increasing the electro-optic bandwidth of the electro-optic modulator 200. In addition, the metal grating structure 180 is between the traveling wave electrodes 140 and the optical waveguide layer 130 and can obstruct an electromagnetic field radiated from the traveling wave electrodes 140 to the substrate layer 110 (comprising low resistivity silicon), thus effectively reducing microwave loss of the traveling wave electrodes 140 and further improving the electro-optic bandwidth of the electro-optic modulator 200.

Figure 7:
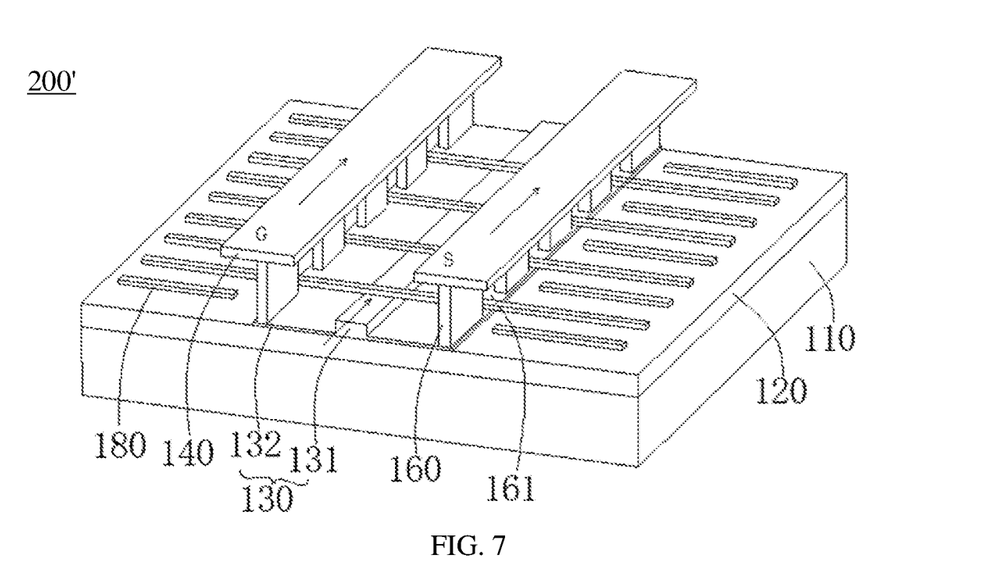
FIG. 7 is a diagram illustrating a silicon-based electro-optic modulator according to a variation of the second embodiment of the present disclosure.

In the embodiment illustrated in FIG. 6, the metal grating structure 180 is distributed on both sides of the electrically conductive structures 160 that electrically connect the doped electrodes 132 and the traveling wave electrodes 140, and is electrically insulated from the electrically conductive structures 160 and the traveling wave electrodes 140. FIG. 7 is a diagram illustrating a structure of a silicon-based electro-optic modulator 200' according to a variation of the second embodiment of the present disclosure. In the embodiment illustrated in FIG. 7, a periodic gap structure 161 may be configured on each one of the electrically conductive structures 160 along the direction in which an electrical signal propagates in the traveling wave electrodes 140. The metal grating structure 180 extends through the periodic gap structure 161 on the electrically conductive structures 160 so that at least a portion of the metal grating structure 180 is continuously disposed below the traveling wave electrodes 140, providing a larger area for the metal grating structure 180 and thus a better shielding effect against an electromagnetic field that radiates downward. As a result, the metal grating structure 180 is capable of effectively reducing microwave loss of the traveling wave electrodes 140. The period of the periodic gap structure 161 may be N times the period of the metal grating structure 180, N being a positive integer greater than or equal to 1. Similarly, the metal grating structure 180 is also configured to be electrically insulated from the electrically conductive structures 160 when the metal grating structure 180 extends through the periodic gap structure 161 of the electrically conductive structures 160. In the embodiment illustrated in FIG. 7, the plurality of periodic gap structures 161 are formed by a plurality of conductive columns spaced from one another. In another embodiment, the plurality of periodic gap structures 161 may be formed by a plurality of electrically conductive vias spaced from one another. In still another embodiment, the plurality of periodic gap structures 161 may be formed by etching a plurality of spaced holes on a continuous electrically conductive panel structure.

Similar to the first embodiment, in the second embodiment, the period of the metal grating structure 180 is in the range of 4 μm to 15 μm. This enables the group velocity of the electrical signal propagating in the traveling wave electrodes to be closer to the group velocity of the optical carrier propagating in the optical waveguide. The electro-optic modulator 200 or 200' may employ single-end-drive GS traveling wave electrodes, differential-drive GSSG traveling wave electrodes, or another type of traveling wave electrodes.

Third Embodiment

Figure 8:
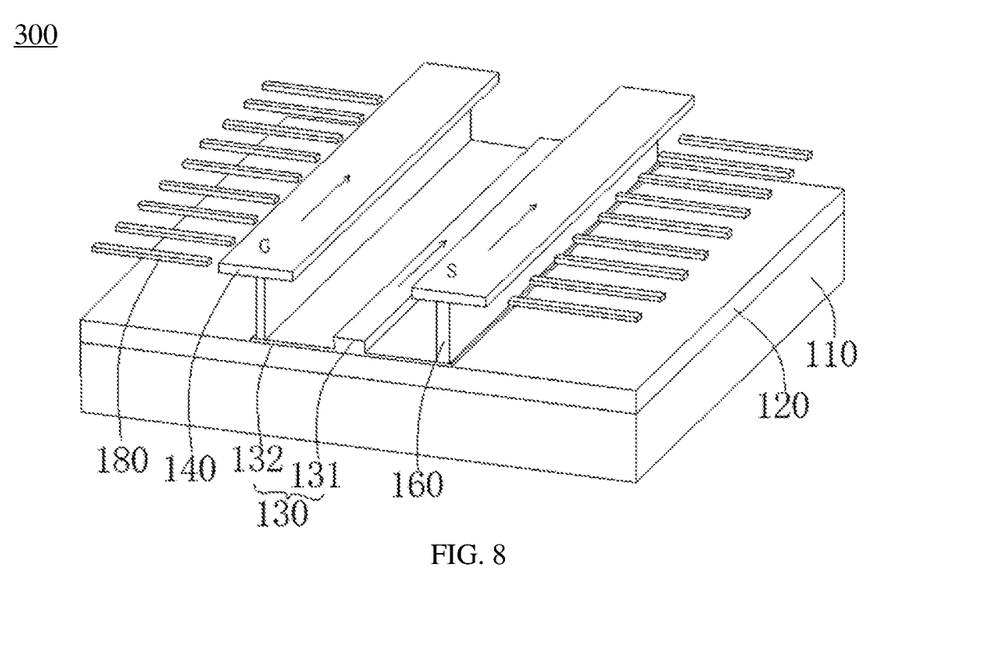
FIG. 8 is a diagram illustrating a silicon-based electro-optic modulator according to a third embodiment of the present disclosure.

FIG. 8 is a diagram illustrating a silicon-based electro-optic modulator 300 according to a third embodiment of the present disclosure. As illustrated in FIG. 8, the third embodiment differs from the first embodiment in that the metal grating structure 180 is disposed on both sides of the traveling wave electrodes 140. Similar to the metal grating structure 180 in the first embodiment, the metal grating structure 180 in the third embodiment is also configured to be electrically insulated from the traveling wave electrodes 140. In other words, only one metal layer needs to be deposited on a cover layer. The traveling wave electrodes are manufactured from the metal layer, and the metal grating structure 180 is manufactured from the metal layer in locations beyond the traveling wave electrodes 140. The periodic structure of the metal grating structure 180 is employed to reduce the propagation velocity of an electromagnetic wave, i.e., the velocity of the electromagnetic wave propagating along the traveling wave electrodes 140, causing the group velocity of an electrical signal propagating in the traveling wave electrodes 140 to match the group velocity of an optical carrier propagating in the optical waveguide 131 of the optical waveguide layer 130, thereby resolving the problem of electro-optic mismatch in the electro-optic modulator 300 and increasing the electro-optic bandwidth of the electro-optic modulator 300. Only one metal layer needs to be deposited, which simplifies the manufacturing process, saves material, and effectively reduces the cost of manufacturing electro-optic modulators.

Similar to the first embodiment, in the third embodiment, the period of the metal grating structure 180 is in the range of 4 μm to 15 μm. This enables the group velocity of the electrical signal propagating in the traveling wave electrodes 140 to be closer to the group velocity of the optical carrier propagating in the optical waveguide 131. The electro-optic modulator 300 may employ single-end-drive GS traveling wave electrodes, differential-drive GSSG traveling wave electrodes, or, of course, another type of traveling wave electrode.

Fourth Embodiment

Figure 9:
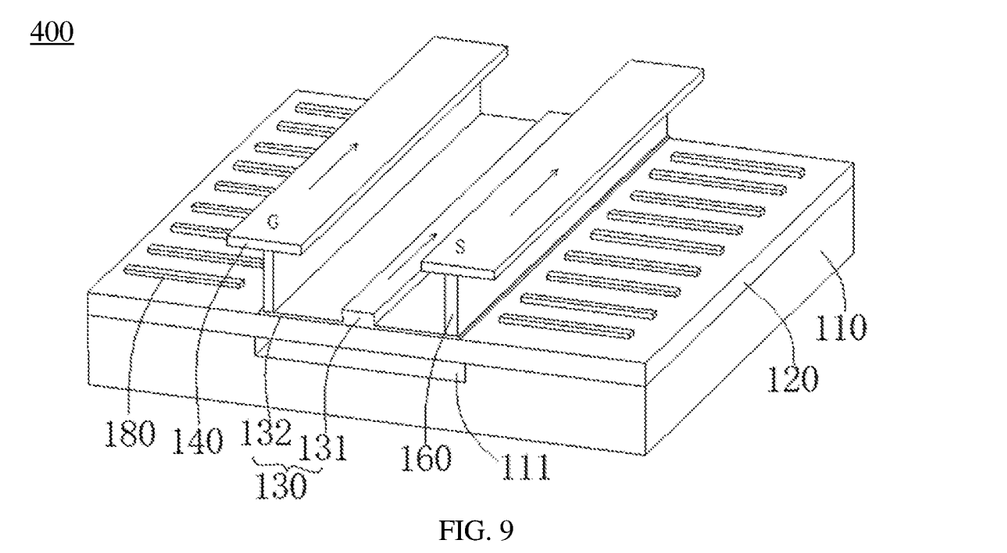
FIG. 9 is a diagram illustrating a silicon-based electro-optic modulator according to a fourth embodiment of the present disclosure.

FIG. 9 is a diagram illustrating a silicon-based electro-optic modulator 400 according to a fourth embodiment of the present disclosure. As illustrated in FIG. 9, on the basis of any of the embodiments described above (e.g., the second embodiment illustrated in FIG. 6), the fourth embodiment adds a groove 111 on a surface of the substrate layer 110 near the insulation layer 120. The groove 111 is located below the optical waveguide 131 of the optical waveguide layer 130 and configured along the optical waveguide 131. By configuring the groove 111 on the substrate layer 110 below the optical waveguide 131, i.e., removing a portion of the substrate layer 110 below the optical waveguide 131, and thus forming a hollow structure between the substrate layer 110 and the insulation layer 120, the distribution of the electromagnetic field in the substrate layer 110 can be reduced, thereby reducing loss of the electromagnetic field in the substrate layer 110, which further reduces microwave loss of the traveling wave electrodes 140 and improves the electro-optic bandwidth of the electro-optic modulator 400. The shape of a cross-sectional area of the groove 111 may vary depending on the actual manufacturing technology. For example, the cross-sectional area of the groove 111 may be a rectangle, as illustrated in FIG. 9, or may be a semi-ellipse or another regular or irregular shape in another embodiment.

Embodiments of the present disclosure provide the following benefits. The addition of a metal grating structure 180 at the periphery of the traveling wave electrodes 140 causes the group velocity of an electromagnetic wave propagating in traveling wave electrodes 140 to match the group velocity of an optical carrier propagating in the optical waveguide 131, thus improving the degree of electro-optic matching for the traveling wave electrodes 140. The metal grating structure 180 also shields, the low resistivity silicon substrate 110, an electromagnetic field radiated from the traveling wave electrodes 140 in order to reduce microwave loss of the traveling wave electrodes 140, thereby effectively improving the electro-optic bandwidth of the electro-optic modulator.

The series of detailed descriptions above is only intended to provide specific descriptions of feasible embodiments of the present disclosure. They are not to be construed as limiting the scope of protection for the present disclosure; all equivalent embodiments or changes that are not detached from the technology of the present disclosure in essence should fall under the scope of protection of the present disclosure.

What is claimed is:

1. A silicon-based electro-optic modulator, comprising:
   a silicon substrate layer, an insulation layer, and an optical waveguide layer stacked sequentially;
   traveling wave electrodes disposed above the optical waveguide layer; and
   a metal grating structure disposed above the optical waveguide layer, the metal grating structure including a plurality of metal lines periodically arranged along a first direction in which an electrical signal propagates in the traveling wave electrodes, and each one of the plurality of metal lines extending in a second direction crossing the first direction,
   wherein the metal grating structure is electrically insulated from the traveling wave electrodes.

2. The silicon-based electro-optic modulator of claim 1, wherein the metal grating structure is disposed above the traveling wave electrodes.

3. The silicon-based electro-optic modulator of claim 1, wherein the metal grating structure is disposed on both sides of the traveling wave electrodes.

4. The silicon-based electro-optic modulator of claim 1, wherein the metal grating structure is disposed between the optical waveguide layer and the traveling wave electrodes.

5. The silicon-based electro-optic modulator of claim 4, wherein
   the optical waveguide layer comprises an optical waveguide and doped electrodes disposed on both sides of the optical waveguide, the doped electrodes being electrically connected to their corresponding traveling wave electrodes by means of electrically conductive structures, a periodic gap structure being configured on the electrically conductive structures along the first direction in which the electrical signal propagates in the traveling wave electrodes.

6. The silicon-based electro-optic modulator of claim 5, wherein the period of the periodic gap structure on the electrically conductive structures is N times the period of the metal grating structure, N being a positive integer greater than or equal to 1.

7. The silicon-based electro-optic modulator of claim 1, wherein the metal grating structure is electrically insulated from the traveling wave electrodes.

8. The silicon-based electro-optic modulator of claim 1, wherein the period of the metal grating structure is 4 μm to 15 μm.

9. The silicon-based electro-optic modulator of claim 1, wherein the metal grating structure and the traveling wave electrodes are made of a same material.

10. The silicon-based electro-optic modulator of claim 1, wherein a groove is configured at a surface of the insulation layer near the substrate layer, the groove being located below the optical waveguide of the optical waveguide layer and configured along the optical waveguide.

11. The silicon-based electro-optic modulator of claim 5, wherein
 at least a portion of the metal grating structure extends through the periodic gap structure and is disposed below the traveling wave electrodes.

* * * * *